Sept. 7, 1954
L. S. WILLIAMS
2,688,519
WEIGHING SCALE LEVER SYSTEM
Filed Aug. 9, 1949
2 Sheets-Sheet 1
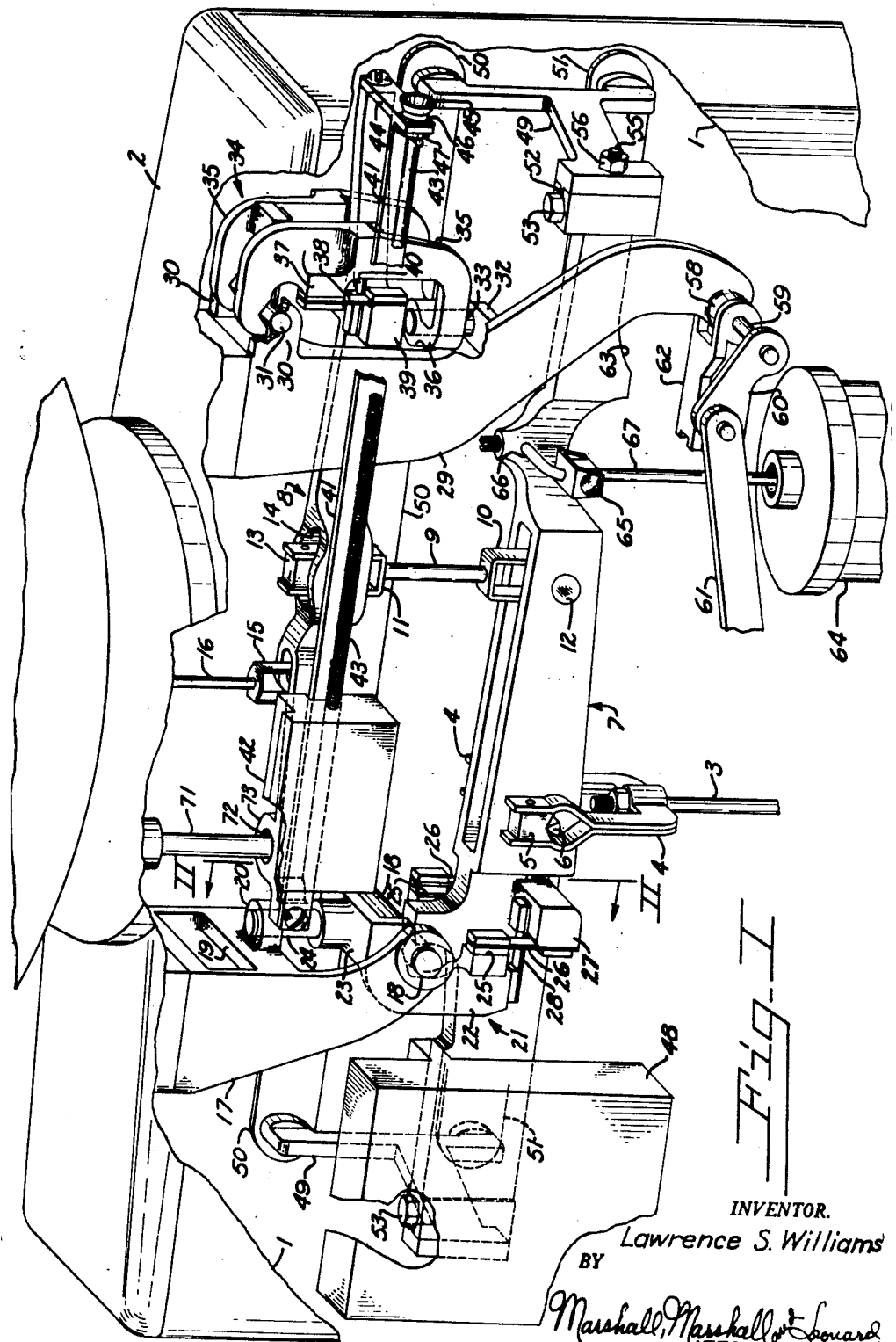
FIG. I
INVENTOR.
Lawrence S. Williams
BY
Marshall, Marshall and Leonard
ATTORNEYS

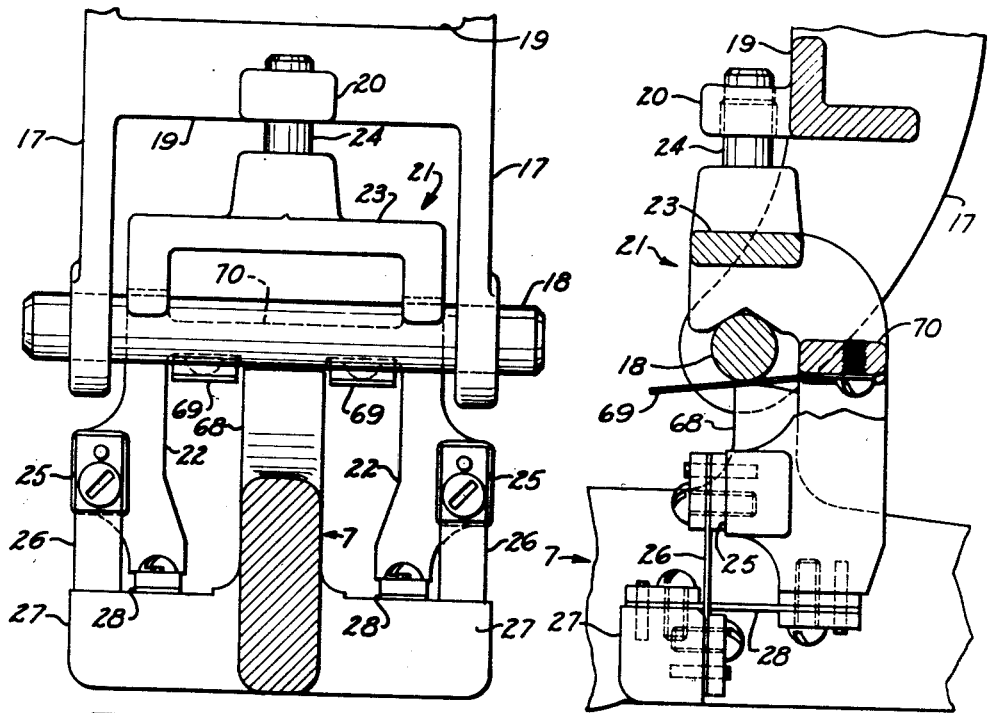
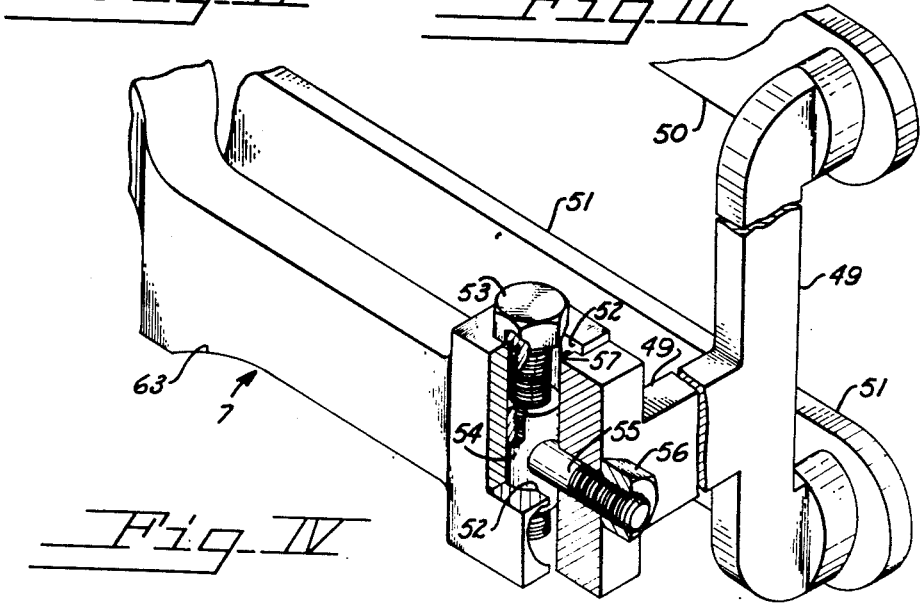

Patented Sept. 7, 1954

2,688,519

UNITED STATES PATENT OFFICE 2,688,519

WEIGHING SCALE LEVER SYSTEM

Lawrence S. Williams, Toledo, Ohio, assignor to Toledo Scale Company, Toledo, Ohio, a corporation of New Jersey Application August 9, 1949, Serial No. 109,342

8 Claims. (Cl. 308—2)

This invention relates to weighing scales and in particular to improvements in the lever system that transmits force from a load receiver to a load counterbalancing mechanism.

It has been common practice in the construction of weighing scales to support the levers of a scale by means of knife edges that cooperate with V-bearings. The knife edges are customarily mounted in the lever and the V-bearings are mounted either in the frame of the scale or in the connections that transmit force from one lever to another. Such a knife edge and V-bearing construction is entirely suitable as long as the knife edge and bearing is not subjected to forces tending to slide the knife edge on the bearing. Thus a knife edge and V-bearing construction may be satisfactorily employed for connecting the steelyard rods of a scale to the levers.

The knife edge and V-bearing construction, however, is not completely satisfactory for use as a fulcrum support for a tare beam lever. This follows because the lever is moved lengthwise a short distance whenever the poise is forcibly driven against the stops limiting its travel. Since the stop at the zero end of the beam is used for locating the poise at its zero position, it becomes the habit of many operators to slide the poise rapidly along the beam allowing it to strike the stop quite forcibly. This practice soon results in damage to the fulcrum knife edge. Another disadvantage of the knife edge and V-bearing fulcrum support for a tare beam lever is the excessive wear that takes place at the fulcrum knife edge if the scale frame is subjected to vibration. The tare beam fulcrum knife edge is particularly susceptible to wear from this source because the mass of the lever is great in comparison to the forces that are transmitted through it and which tend to hold the knife edge in firm contact with the bearing. This lack of force permits the knife edge to dance on the bearing whenever the bearing follows the vibration of the scale frame.

Flexible strips located in intersecting planes have been used as pivoting connections between weighing scale levers and elements to be pivotally connected thereto. The flexible strips are not subject to wear as is a knife edge and bearing but are susceptible to damage from overload particularly in directions in which they are not intended to sustain load. Thus a lateral or upward force applied to a knife-edge supported lever merely lifts the knife edge from its bearing while a similarly directed force applied to a flexible strip supported lever is apt to result in buckling the strips thus rendering them unfit for further use.

The principal object of this invention is to provide means for protecting crossed flexible strips serving to support the levers of a weighing scale, which means serves to guard the strips against excessive force in directions tending to damage them.

Another object of the invention is to provide an intermediate member between the frame of the scale and the flexible strips supporting the lever which intermediate member is yieldable in directions to prevent overloading the flexible strips.

An ancillary object of the invention is to mount the zero adjusting weight of the scale mechanism on a lever of the scale that, lying in the same vertical plane as the tare beam lever, rotates in the opposite direction from the tare beam lever upon the application of load.

A still further object of the invention is to employ the beam and poise of the tare beam lever as structure for adjusting the pendularity of the lever system.

More specific objects and advantages are apparent from the following description of a preferred embodiment of the invention.

The invention consists of an improved lever system for a weighing scale in which the levers are pivotally supported by means of flexible strips from brackets which in turn are yieldably supported in the frame of the scale; in which the beam and poise of the tare beam lever is vertically adjustable with respect to the lever for adjusting the pendularity thereof; and in which the zero adjusting weight of the scale is carried on a lever that is parallel to the tare beam lever and which rotates in the opposite direction from the tare beam lever upon a change in load. The invention also contemplates the use of brackets depending from a scale cabinet top for supporting the intermediate members to which the levers are pivotally connected. Still further, the invention contemplates the application of force to the intermediate members in directions and amounts such that the members are continuously urged in one direction regardless of the load being weighed.

A weighing scale lever system constructed according to the invention is illustrated in the accompanying drawings.

In the drawings:

Figure I is a perspective view, with parts broken away, of the upper portion of a scale cabinet showing the positions and cooperation of the levers supported therein.

Figure II is an enlarged vertical section of the fulcrum support for the tare beam lever as seen from the line II—II of Figure I.

Figure III is a side elevation of the tare beam fulcrum system.

Figure IV is a perspective view showing the mounting arrangement providing vertical adjustment of the tare beams with respect to the tare beam lever.

These specific figures and the accompanying description are intended merely to illustrate the invention but not to impose limitations on the claims.

The improved lever system is housed in the upper part of a cabinet 1 that includes a top or deck 2 upon which a load counterbalancing mechanism (not shown) may be erected.

Forces from loads to be weighed are transmitted through a steelyard rod 3 that is suspended from a stirrup 4 having V-bearings 5 resting on load knife edges 6 of a tare beam lever 7. The force is transmitted from the tare beam lever 7 to a second lever 8 through a connection that comprises a short steelyard rod 9, a lower stirrup 10, and an upper stirrup 11. The stirrup 10 carries a V-bearing that cooperates with a knife edge portion of an inserted pivot 12 of which only the rounded end of the shank is visible in the drawing. The upper stirrup 11 has a V-bearing 13 that rests on a power pivot of the lever 8 which pivot spans the space between the sides of an opening 14 formed in the lever 8.

The lever 8 is provided with a power pivot that cooperates with a V-bearing held in a stirrup 15 attached to the lower end of a steelyard rod 16 that transmits the force to a load counterbalancing and indicating mechanism erected above the deck 2 of the cabinet. The pivots and bearing involved in this force transmission path are all conventional in design and in their cooperation with each other.

The support for the tare beam lever 7 includes a downwardly directed forked frame 17 that is attached to the lower surface of the top 2 of the cabinet 1. A heavy rod 18 is inserted through holes in the bottom ends of the forked portion of the frame 17 and constitutes a generally horizontal support member. Above the rod 18 a crossweb 19 having a laterally directed ear 20 interconnecting the upper central portions of the sides of the forked frame 17. The ear 20 has a vertical hole drilled therethrough which hole constitutes a guideway.

A bracket 21 is supported on the heavy rod 18. This bracket comprises a pair of inverted C-shaped legs 22 the long arms of which extend down past the heavy rod 18 and the upper short legs of which have their lower edges notched to form hooks resting on the heavy rod 18. The upper ends of the legs 22, the short sides of the C-shape, are joined by a cross member 23. A guide rod 24 seated in the cross member 23 enters the hole in the ear 20 of the frame 17 thus stabilizing the bracket 21 in the frame 17.

In the bracket 21 the notched portions of the legs 22 constitute downwardly directed portions engaging the horizontal support—the heavy rod 18—while the guide rod 24 constitutes another portion that engages a guideway, in this case the hole through the ear 20.

The lower horizontal branches of the C-shaped legs 22 are extended forward past a vertical plane through the heavy rod 18 and are provided with smooth vertical faces 25 to which flexible support strips 26 are secured. The lower ends of the flexible support strips 26 are clamped or otherwise secured against vertical faces of laterally directed lugs 27 of the tare beam lever 7. The flexible strips 26 are stressed in tension and serve to support the weight of the tare beam lever 7 and a greater portion of the force applied through the steelyard rod 3.

Longitudinal movement of the tare beam lever 7 is prevented by a pair of longitudinally extending flexible strips 28 each having one end clamped to a lower surface of the C-shaped legs 22 and having their other ends clamped or otherwise secured to horizontal faces of the laterally extending lugs 27. The corner between the surfaces of the lugs 27 to which the flexible strips 26 and 28 are attached is beveled so that the intersection of the strips—the pivoting axis of the lever—is located a short but appreciable distance from the adjacent clamped portions of the strips. This intersection of the strips is selected to provide the least possible amount of translation of the pivoting axis as the lever is swung through its operating range.

The notched portions of the upper ends of the C-shaped legs 22, which merely rest on the horizontal heavy rod 18, allow the bracket 21 to be displaced upwardly or horizontally should the forces applied to the lever 7 tend to buckle the flexible strips 26 and 28.

In the construction of the bracket 21 the guide rod 24, if extended downward, would pass through the center of the heavy rod 18—the horizontal support—when the bracket is in place on the rod. Furthermore, in order to permit movement of the bracket in absorbing horizontal forces applied to the lever, there must be clearance between the guide rod 24 and the hole in the ear 20. Yet, since the stiffness of the flexible strips 26 and 28 contributes to the counterbalancing of load, it is necessary that all backlash be eliminated from the bracket mounting. In this example this is easily accomplished by locating the pivoting axis, the intersection of the flexible strips, in a plane that is offset from the center of pressure of the bracket 21 against the horizontal support rod 18. Various arrangements may be made in that it is not necessary that the flexible strips 26 and 28 be located vertically and horizontally respectively nor that the guide rod 24 be located vertically above the support rod. All that is required is that the bracket 21 be yieldably supported on the support rod 18 and that the normal load forces applied to the bracket exert a moment tending to rotate the bracket in one direction. This condition is satisfied as long as the intersection of the strips, the pivoting axis, is in a vertical plane that is offset from but parallel to a vertical plane through the support for the bracket 21. In the example shown, the guide rod 24 is located vertically above the notches that engage the horizontal support rod 18 while the load carrying flexible strips, the strips 26, are located in a vertical plane that is parallel to but displaced from the axis of the guide rod 24.

The support for the second lever, the lever 8, constitutes another example in that the construction of the bracket is somewhat different from the bracket 21 carrying the tare beam lever 7. In this second example a frame 29 depending from the top or deck 2 has a pair of horizontally directed ears 30 in which is mounted a heavy cross rod 31 that constitutes a horizontal support. The frame 29 also includes a horizontally directed ear 32 located a substantial distance below the support rod 31. A short rod 33 is set vertically into the ear 32 and serves as a guideway. A bracket 34 comprising a pair of E-shaped side frames 35 is carried on the support rod 31 and at the lower end has a cross member 36 provided with a hole that is a sliding fit on the guideway rod 33. The lower surfaces of the upper horizontal portions of the E-shaped side members 35 are notched so as to firmly position the bracket 34 on the support rod 31.

Each of the E-shaped side members 35 includes a short horizontally extending projection 37, constituting the middle bar of the E-shape, which is located a substantial distance above the center of the bracket 34 and which projections 37 provide vertical faces against which flexible strips 38 are attached. The lower ends of the flexible strips 38 are clamped against vertical surfaces of horizontally directed lugs 39 of the lever 8 and thus serve to carry the weight of the lever and the forces applied thereto through the load and power pivots of the lever. Any longitudinal movement of the lever is prevented by horizontally directed flexible strips 40 each having one end attached to a horizontal surface of the lugs 39 and having their other ends attached to horizontal surfaces of the bracket 34. The side members 35 of the bracket 34 are separated by sufficient distance so that the lever 8 may be inserted therebetween and thus be located symmetrically between the supporting flexible ribbons 38 and 40.

In this arrangement, as in the previous example of fulcrum support, the intersection of the supporting ribbons 38 and 40 constitutes the turning axis or pivoting axis for the lever and such turning axis is located in a vertical plane that is offset from the support of the bracket 34. Thus in each example the normal load forces applied to the bracket take up all the backlash between the bracket and its guideway so that for normal forces there is no relative motion at any time between the bracket and its support.

The second lever 8 is provided with an ungraduated beam 41 on which a weight 42 is slidably mounted. The weight 42 is positioned along the beam 41 by a lead screw 43 that is threaded through the weight 42 and that is rotatably journaled in a cross bracket 44 secured to the end of the lever 8 and to the ungraduated beam 41. The end of the lead screw 43 extends through the bracket 44 and is provided with a conical socket 45 arranged to guide a screw driver into a slot in the end of the lead screw when adjustment of the weight 42 along the beam is required. Longitudinal motion of the lead screw 43 which would move the weight along the beam is prevented by a spring 46 interposed between the conical socket 45 on the end of the screw 43 and the bracket 44 which spring serves to hold a collar 47 of the lead screw 43 snugly against the other side of the cross bracket 44. The cabinet 1 has a hole which is in line with the lead screw 43 when the levers are in zero load position so that adjustment of the position of the weight 42 may be easily accomplished.

The weight 42 serves as a zero load indication adjustment for the scale and offers an exceptionally wide range of adjustment in that it may be moved to any intermediate position between a position near the free end of the lever 8 and a position near the other end of the lever. This wide range of adjustment is made possible by the substitution of the flexible strips 38 and 40 for the conventional knife edges and V-bearings. Without this change location of the weight 42 to one side of the lever so that it is movable past the fulcrum offsets the center of gravity of the lever assembly to such an extent that under some load conditions, particularly at light load, the flexible strip 38 on the side opposite the weight 42 is completely relieved of tensile stress and may even be subjected to a small amount of compressive stress. Since a knife edge and bearing is incapable of maintaining its operative relation upon such a reversal of force, it is apparent that this method of securing zero adjustment cannot be used with a conventional knife edge and bearing.

If the pull on the lever system resulting from the weight of the load receiver and of the levers is greater than the initial or zero load pull required by the counterbalancing mechanism the tare beam lever 7 is provided with a balance weight 48 that is fixedly mounted on an arm of the lever in position to counterbalance a portion of the initial pull of the load receiver lever system.

The tare beam lever 7 is provided at each of its ends with a beam bracket 49 that carries a tare beam 50 and a capacity beam 51 upon which tare and capacity poises are slidably mounted. The beam brackets 49 are each vertically adjustable with respect to the lever 7 so that the weight of the beams and poises may be employed to adjust the pendularity of the lever 7. The construction to permit the vertical adjustment of the beam brackets 49 with respect to the lever 7 is shown in detail in Figure IV. In this arrangement each end of the lever 7 is provided with a vertical slot 52 the bottom of which is enlarged as by boring a vertical hole through the lever. An adjusting bolt 53 is positioned in the enlarged portion of the slot 52 with its head resting on the upper surface of the lever 7 and with its threads engaging internal threads of a sleeve-like head 54 of a T-bolt 55. The sleeve-like head 54 is a sliding fit within the enlarged portion of the slot 52 and its vertical position within the slot 52 may be adjusted by rotation of the adjusting bolt 53.

The stem of the T-bolt 55 extends horizontally through the slot 52 in the end of the lever 7 and through a hole in the end of the beam bracket 49. A nut 56 threaded onto the end of the T-bolt 55 serves to clamp the bracket 49 in its adjusted position with respect to the lever 7. Since rotation of the beam brackets 49 on the stems of the T-bolts would effect uncontrolled vertical movement of the beams and poises, rotation of the bracket 49 with respect to the lever must be prevented even though the nut 56 is loosened. This is accomplished by a tongue 57 formed on the beam bracket 49 and fitting into the slot 52 cut in the end of the lever 7.

Vertical adjustment of each end of the tare and capacity beams 50 and 51 is required because these beams must extend precisely parallel to the pivot line of the lever in order that the pendularity of the lever shall be independent of the positions of the poises along the beams. It is only by simultaneously adjusting both ends of the beams that this condition of parallelism may be maintained. The improved adjusting mechanism comprising the adjusting bolt 53 and the sleeve headed T-bolt 55 makes it a comparatively simple matter to make the pendularity adjustment in definite easily determined amounts because the magnitude of the adjustment is directly proportional to the rotation of the adjusting bolts 53.

The frame 29 that carries the bracket 34 of the fulcrum support of the second lever 8 is extended downwardly into the region beneath the tare beam lever 7 and at its lower end is provided with a horizontally directed boss 58 journaling a short shaft 59. An arm 60 rigidly attached to the short shaft 59 is connected through a link 61 to the locking mechanism of the scale and is arranged so that when the scale mechanism is locked the short shaft 59 is rotated to swing a strut 62 also attached to the short shaft 59 upwardly into engagement with a cam surface 63 formed on the lower edge of the tare beam lever 7. The strut 62 upon engaging the cam surface 63 raises the free end of the tare beam lever 7 slightly above its zero load position and holds it in such raised position.

The lever system illustrated in the drawings is employed with an automatic load counterbalancing mechanism and, to minimize swinging motion of the indicator of such mechanism following each change in load, is connected to a hydraulic dashpot 64. The connection is through a modified ball and socket joint 65 the socket of which is formed on the end of a rod 66 extending from the lever 7 and the ball of which is included in a piston rod 67 of the hydraulic dashpot 64. The resistance to motion offered by the dashpot 64 prevents excessive overshoot of the indicator of the load counterbalancing mechanism and thus facilitates the reading of load indications.

Referring now to Figures II and III, which show the lower end of the frame 17 and the bracket 21, it will be noticed that the tare beam lever 7 is symmetrically located with respect to a vertical center line through the bracket and frame so that the load applied to the supporting flexible strips 26 on each side of the lever is nearly equally divided. These drawings also show an upwardly directed guard 68 formed integrally with the lever 7. The upper surface of the guard 68 is substantially concentric with respect to the intersection of the flexible strips 26 and 28, i. e., the pivoting axis of the lever 7, and is positioned closely adjacent to but not touching the lower surfaces of the heavy rod 18. The guard 68 by striking the heavy horizontal rod 18 prevents kinking the supporting ribbons 26 when the lever 7 is forced upward.

Figures II and III also show a pair of relatively stiff leaf springs 69 which, attached to a cross member 70 of the bracket 21 and pressing against the lower surface of the heavy horizontal support rod 18, serve to yieldably hold the bracket 21 in position on the horizontal support rod 18.

The upper or auxiliary lever 8 is guarded against excessive horizontal displacement in any direction by a heavy downwardly directed pin 71 seated in the cabinet top 2 and passing through a clearance hole 72 drilled in an ear 73 extending from the free end of the lever 8. In normal operation, the heavy pin 71 does not contact the sides of the hole 72.

The location of the zero adjusting weight 42 on the second or auxiliary lever 8 rather than on the tare beam lever 7 is of material advantage in a portable scale. The size of the zero adjusting weight 42 and the weight of the poises and beams of the tare beam lever 7 may be selected so that of the total force applied to the counterbalancing mechanism because of the weight of these elements the force contributed by each is inversely proportional to the angular travel of the respective lever. When this condition is fulfilled the composite center of gravity of the tare beam lever 7 and the auxiliary or secondary lever 8 moves along a straight path that is parallel to the vertical center line of the weighing scale. As long as this composite center of gravity moves along such a straight line the scale assembly may be tipped to either side an appreciable distance without introducing any error into the indication of load. This arrangement of the zero adjusting weight on the secondary lever 8 accomplishes this improved result without the addition of any extra weights other than those required in the normal construction of the scale.

The improved lever system illustrated in the drawings provides a highly accurate self-protecting assembly that is practically immune to wear, that is easy to construct, and that is exceptionally accurate in operation.

Various modifications in the details of construction may be employed in adapting the improved lever system to various weighing scales without departing from the spirit and scope of the invention.

Having described the invention, I claim:

1. In a weighing scale, in combination, a lever to be pivotally supported, a frame having a generally horizontal support member and a guideway, a bracket having a downwardly directed portion engaging the horizontal support member and another portion engaging the guideway, and a flexible strip connecting the lever to the bracket, said strip being located in a vertical plane that is offset from the cooperating portions of the portion and support member.

2. In a weighing scale, in combination, a lever to be pivotally supported, a frame having a generally horizontal support member and a guideway, a bracket having a downwardly directed V-groove engaging the support member and a portion engaging the guideway, means for pivotally connecting the bracket to the lever, said means defining a pivoting axis that is offset from a vertical plane through the center of pressure of the bracket on the support member.

3. In a weighing scale, in combination, a lever to be pivotally supported, a frame having a generally horizontal support member and a guideway, a bracket having a downwardly directed V-groove engaging the support member and a portion engaging the guideway, flexible strips disposed in each of at least two planes for pivotally connecting the bracket to the lever, said strips defining a pivoting axis that is offset from a vertical plane through the center of pressure of the bracket on the support member.

4. In a weighing scale, in combination, a lever to be pivotally supported, a frame having a generally horizontal support member and a guideway, a bracket having a downwardly directed V-groove engaging the support member and a portion engaging the guideway, flexible strips disposed some in a vertical plane and some in a horizontal plane for pivotally connecting the bracket to the lever, the vertical strips being located in a plane that is offset from a vertical plane through the center of pressure of the bracket on the support member.

5. In a weighing scale, in combination, a lever to be pivotally supported, a frame having a generally horizontal support member and a guideway, a bracket having a downwardly directed V-groove engaging the support member and a portion engaging the guideway, crossed flexible strips for pivotally connecting the lever to the bracket, and resilient means on the bracket engaging the frame for resisting movement of the bracket on the frame.

6. In a weighing scale, in combination, a lever to be pivotally supported, a frame having a generally horizontal support member and a guideway, a bracket having a downwardly directed V-groove engaging the support member and a portion engaging the guideway, crossed flexible strips for pivotally connecting the lever to the bracket, and a flat spring mounted in the bracket and engaging the lower side of the support member for resisting movement of the bracket on the frame.

7. In a weighing scale, in combination, a lever to be pivotally supported, a frame having a generally horizontal support member and a guideway, a bracket having a downwardly directed portion engaging the support member and another portion engaging the guideway, flexible strips for connecting the lever to the bracket, and a raised section on the lever that is juxtaposed to but not touching said frame for preventing the transmission of excessive force through said strips.

8. In a weighing scale, in combination, a lever to be pivotally supported, a bracket, flexure strips pivotally connecting the lever to the bracket, a fixed support, said bracket being supported by the fixed support, and preloaded resilient means for holding the bracket immovable with respect to the support except during the application of forces greater than the preload.

References Cited in the file of this patent

UNITED STATES PATENTS

| Number | Name | Date |
|---|---|---|
| 569,893 | Taylor | Oct. 20, 1896 |
| 1,689,976 | Stimpson | Oct. 30, 1928 |
| 2,028,545 | Howe | Jan. 21, 1936 |
| 2,058,535 | Walker | Oct. 27, 1936 |
| 2,322,108 | Best | June 15, 1943 |